United States Patent [19]
Nielsen

[11] Patent Number: 6,055,570
[45] Date of Patent: *Apr. 25, 2000

[54] SUBSCRIBED UPDATE MONITORS

[75] Inventor: Jakob Nielsen, Atherton, Calif.

[73] Assignee: Sun Microsystems, Inc., Palo Alto, Calif.

[ * ] Notice: This patent is subject to a terminal disclaimer.

[21] Appl. No.: 08/826,589

[22] Filed: Apr. 3, 1997

[51] Int. Cl.[7] ...................................................... H01J 13/00
[52] U.S. Cl. ........................................................... 709/224
[58] Field of Search ........................ 395/200.53, 200.54, 395/609, 334, 200.47, 200.1, 800, 600; 380/25; 364/200; 709/217, 223, 224; 712/1; 707/1

[56] References Cited

U.S. PATENT DOCUMENTS

| | | | |
|---|---|---|---|
| 4,855,906 | 8/1989 | Burke | 364/200 |
| 4,961,224 | 10/1990 | Yung | 380/25 |
| 5,113,499 | 5/1992 | Ankney et al. | 395/325 |
| 5,155,857 | 10/1992 | Kunisaki et al. | 395/800 |
| 5,185,860 | 2/1993 | Wu | 395/200 |
| 5,553,282 | 9/1996 | Parrish et al. | 395/600 |
| 5,586,254 | 12/1996 | Kondo et al. | 395/200.1 |
| 5,596,723 | 1/1997 | Romohr | 395/200.16 |
| 5,678,041 | 10/1997 | Baker et al. | 395/609 |
| 5,710,884 | 1/1998 | Dedrick | 395/200.47 |
| 5,768,552 | 6/1998 | Jacoby | 395/334 |
| 5,813,007 | 9/1998 | Nielsen | 707/10 |
| 5,848,410 | 10/1998 | Walls et al. | 707/4 |
| 5,890,164 | 3/1999 | Nielsen | 707/201 |

*Primary Examiner*—Dennis M. Butler
*Attorney, Agent, or Firm*—McDermott, Will & Emery

[57] ABSTRACT

A user can monitor changes to information located on a network by registering with an update monitor service. The update monitor service can run as a stand alone server in the network or can run on a user computer or on the computer of an Internet Service Provider. The update monitor service obtains information about changes to information being monitored for the server on which the information is located or from a comparison of old and current versions of the information. The user can modify the list of information sources to be monitored by the update monitor service.

20 Claims, 20 Drawing Sheets

<TITLE> The title of the page </TITLE> ← 800

<H1> The Primary Heading </H1> ← 810

<H2> The Secondary Heading </H2> ← 820

<H3> The Tertiary Heading </H3> ← 830

Domain = "www.nasa.gov" ← 840

Figure 8

TABLE A

| USER ID | PASSWORD | DATE/TIME THIS VISIT | DATE/TIME LAST VISIT | LOGIN SECURITY LEVEL |
|---|---|---|---|---|
| msharp | 12345 | 2/2/97 23:01 | 2/1/97 08:30 | HIGH |
| jsmith | ABCDE | 3/1/97 22:30 | 3/28/97 12:45 | LOW |
| --- | --- | --- | --- | --- |

Figure 10A

TABLE B

| USER ID | URL |
|---|---|
| msharp | www.nasa.gov |
| msharp | www.jpl.gov |
| jsmith | www.abc.com |
| --- | --- |

Figure 10B

TABLE C

| URL | PAGE NAME | UPDATE MGR EMAIL ADDR | DATE/TIME LAST CHANGE | DEGREE OF CHANGE | UPDATE NOTIFICATION TEXT | # OF SUB SCRIBERS |
|---|---|---|---|---|---|---|
| www.nasa.gov | NASA Homepage | webmaster@nasa.gov | 3/10/97 23:59 | (null) | New links... | 1242 |
| www.abc.com | ABC Corp | update@abc.com | 3/12/97 08:00 | (null) | Great News... | 52 |
| www.jpl.gov | JPL Photos | (null) | 3/15/97 09:00 | .25 | (null) | 327 |
| ... | ... | ... | ... | ... | ... | ... |
| ... | ... | ... | ... | ... | ... | ... |

UPDATE - SUBSCRIBE URL

Figure 12A

UPDATE - UNSUBSCRIBE URL

Figure 12B

UPDATE - NOTMONITORED URL

Figure 12C

UPDATE - NOTIFICATION URL

CHANGE - ABSTRACT TEXT

Figure 12D

SUBSCRIBED UPDATE MONITORS

BACKGROUND OF THE INVENTION

Cross Reference to Related Applications

This application is related to U.S. patent application Ser. No. 08/668,893 filed on Jun. 24, 1996, now U.S. Pat. No. 5,890,164 by the same inventor which is hereby incorporated by reference in its entirety.

TECHNICAL FIELD

The invention is related to network based information retrieval systems such as found on the world wide web and, more particularly, to technology for allowing a user to check for updates of information contained on network sites of interest.

Description of Related Art

Highly dynamic information retrieval systems, such as the World Wide Web (WWW), have content items (i.e. documents, images, sounds and other types of data) that change at irregular intervals. Users of such information systems may find it important to repeatedly access specific content items to apprise themselves of any changes that may have been made since their previous access. Conversely, users may forget to check content items of interest and thereby miss important changes. In either case, the user does not have the tools to exercise positive control over the timely accessing of content items of interest that have changed.

Bookmarking items of interest while using a WWW Browser is known. This method allows the user to add a particular content item to a list. This list can later be used to access the item to check for changes. Currently, some WWW Browsers (e.g. Netscape Navigator 3.0) provide a function that queries each of the items, using the Universal Resource Locator (URL) information or network addresses stored in the bookmark list, and presents a visual cue to the user indicating which content items have been changed. This method has several weaknesses. No distinction is made between a minor or major change (e.g., fixing a typographical error versus adding new substantive content). Additionally, all bookmarks are checked including those that the user is not interested in because either a specific content item is known to change hourly (e.g., news summaries) or changes to the item are unimportant within the context of the user's needs (e.g., information not of interest to the user was changed). Finally users place content items in a bookmark list for a variety of reasons unrelated to possible future changes of the content item; this results in a bookmark list that is undifferentiated and that may grow to an excessive size, thereby constraining its usefulness.

Another related prior art is that of "push media" which delivers subscribed content to the user automatically. Point-Cast™ and Castanet™ are push media providers which utilize a proprietary software solution to alert users automatically to changes in content items. One difficulty with this method is that the frequency of updates is determined by the service providers. Another difficulty with push media is that, since the required software is proprietary and not available on all computing platforms, the push media services fall outside the standards for Web browsing technology. Additionally, although the user can personalize some of the information that is pushed to the desktop, a substantial portion of the information is the same for all risers. Thus there is a risk of both information overload in an area of no interest to the user and information starvation in areas which are of interest to the user but not sufficiently covered by the service provider.

Email alert systems are known. In such systems (e.g., AnchorDesk) the user subscribes to information sources and the service provider sends the user email that contains new information of interest (e.g., news summaries) or sends the user email indicating that a particular source of information may be found at a specific URL or network addresses. Since email is essentially a separate medium from the WWW, and since the email alerts will be mixed in with the user's other email messages, the email alert systems are not a seamless or simple solution to monitoring changes in content items.

Both the push media and email alert systems suffer from an additional drawback: they depend upon content providers (e.g., WWW site owners) to incur the expenses necessary to develop an update notification systems. Thus, the user will not be able to get update notifications for all content of interest since some content providers will not be willing to add a notification system to their web sites.

SUMMARY OF THE INVENTION

The present system provides apparatus, systems, processes and computer program products which will allow users to check for updates of content sites of interest in a unique and simple fashion which overcomes the problems with the prior art outlined above.

The invention relates to an update monitor service server which may reside on a user's individual computer but more often will reside on the computing equipment of large online services such as America Online™ or Yahoo!™. The WWW will be used for illustrative purposes here, but the invention is suitable for any sort of network environment where content sites can be accessed using network addresses. It is anticipated that large online services will incorporate both advertising, to defray costs and avoid a user subscription fee, and links to general information sources, such as news summaries and search engines, to encourage monitor usage.

The invention relates to apparatus for monitoring changes in content on a network, including a computer connected to the network, a database of network addresses of information stored on the network to be monitored for changes, and a process running on the computer for determining when information at a network address has changed.

The invention is also related to a system including a network, one or more content servers connected to the network, one or more user computers connected to the network, an update monitor service server connected to the network, the update monitor service server being configured to provide information to one or more user computers about changes in content of information stored on one or more content servers.

The invention is also related to a method of providing information to one or more users about changes in content of information stored on one or more network servers, registering a user together with a list of network addresses of information the user desires to monitor for change in a database, and subscribing to a change notification service provided by a server on which a network address is located, if one is provided.

The invention is also related to computer program products for providing an update monitor service.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following descriptions, in which:

FIG. 8 illustrates the Hypertext Markup Language (HTML) tagging system.

FIG. 10A is an exemplary database table layout for user information in accordance with the invention.

FIG. 10B is an exemplary database table layout for relating user identifications to specific URLs for use by the invention in accordance with the invention.

FIGS. 12A, 12B and 12C are message structures used by the invention to send messages to the update manager of monitored sites in accordance with the invention.

FIG. 12D is the message structure expected by the update monitor service sent from the update manager to indicate changes in accordance with the invention.

NOTATIONS AND NOMENCLATURE

Figure 1A:
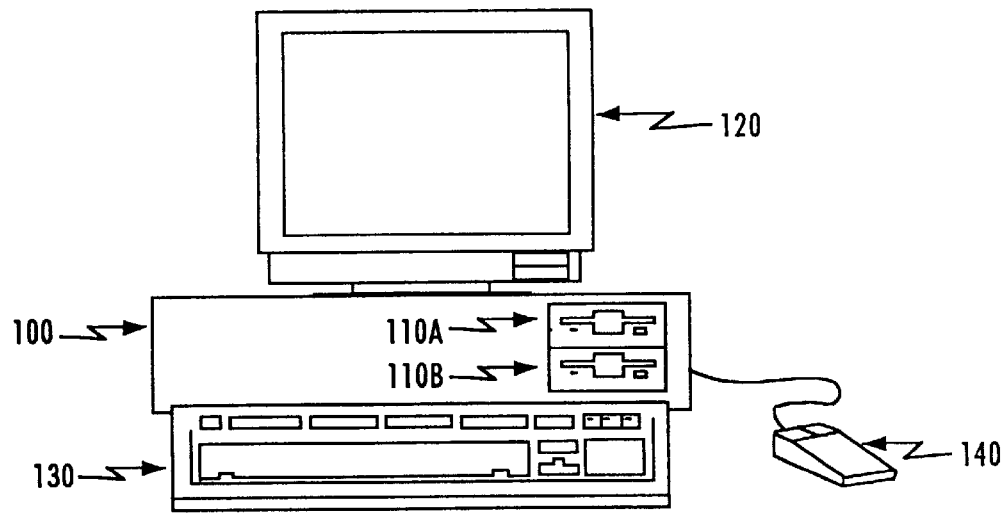
FIG. 1A illustrates a computer of a type suitable for carrying out the invention.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform tie required method steps. The required structure for a variety of these machines will appear from the description given.

DESCRIPTION OF THE PREFERRED EMBODIMENT

The update monitor service in accordance with the invention provides one or more individual pages for each user to store the URLs of those sites he wants monitored for changes. To access his page or pages, the user would use the prior art to explicitly login or, alternatively, use browser "cookies". Cookies are a method of allowing the login information to be stored locally on the user's computer and then sent to a web server along with the requested URL. An individual may prefer the more secure explicit login if they decide that their page of monitored URLs is sensitive information, while others may have ease-of-use as a primary consideration and therefore may prefer to utilize the cookie technology.

Upon successful login, a list of those subscribed sites that have changed since his last visit to the monitor page is displayed to the user. Each entry lists the name of the site and either an abstract of the change made or a numeric or visual representation of the degree of change made. The abstract of the change is provided by the content provider. In cases where the content provider is unwilling to provide change notification a degree of change measurement process described in more detail in said U.S. patent application Ser. No. 08/668,893, filed on Jun. 24, 1996, by the same inventor (Attorney Docket No. P1614) is invoked and computes two measures: first, the degree of change based upon the raw number of words on a web page, and second, the degree of change based upon a paragraph by paragraph analysis of the entire document.

In order to view the change status of web sites, the user must first subscribe to them using the monitor page. By pressing the "Add" button, the user is prompted for the URL, and if it exists, it is added to his list of subscribed pages in a database. If, by the time of the user's next visit to the monitor page, the subscribed page has been determined to have been changed (either via update notification from the content provider or by the invoking the degree of change process) the user sees the name of the site listed after the initial login. If the URL to add is new to the monitor service then a process is initiated whereby the page referenced by the URL is retrieved, the name of the web site is determined via an HTML parsing algorithm and the email address of the person or process responsible for providing change notification to the monitor service is retrieved. If a valid email address is available, the monitor service sends a structured email to the update manager requesting a subscription to its update notification service. If no valid email address is found, then the monitor service will invoke the degree of change process at specified times.

When a site is no longer of interest to the user, he may unsubscribe the site from the update monitoring service by pressing the "Remove" button and then selecting those sites to be removed. If the site being removed now has a resulting number of users equal to zero, the site is purged from the monitor service.

Additionally, the user is provided with a "Show All Subscribed Sites" button so that a list of all subscribed sites can be reviewed. Such a list would be useful to refresh the user's memory as to which sites he currently subscribes to and will assist the user in determining those sites he wishes to add or remove.

If the user wishes to retain the change information on his monitor page so that it is available the next time he access the monitor page, he may press the "Retain Change Information" button. This will save all the change information that was displayed upon the current access of the monitor page except for sites explicitly removed during the current session.

The invention relies, in part, upon the use of a database system containing three tables of information. Table A contains the user's identification, password, the date and time of his last visit to the monitor page and the type of login security preferred. Table B contains a list of user identification and subscribed URLs. Table C contains information about the URL including the URL itself, the site name, the date and time of the most recent change to the page, the degree of change information (if needed), the number of users that subscribe to this URL, and the update manager's email address along with the update manager's most recent abstract of changes.

The update manager is a person or an automated process conceptually residing at the monitored URL site. The update manager is responsible for notifying the update monitor service when changes are made and for providing an abstract of those changes using structured email. In those situations where no update manager exists, the degree of change process is used to monitor changes. Typically, the update monitor service server would initiate the degree of change process during periods of low load on the server. The process would simply look at each URL contained within Table C and, for those that do not contain an email address for an update manager, would retrieve the page specified by the URL and invoke the degree of change algorithm to determine how much the page has changed. If the change value is greater that some threshold, presumably zero, then the resulting threshold value is stored in Database C along with the current date and time.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC workstation from Sun Microsystems, Inc.

Figure 1B:
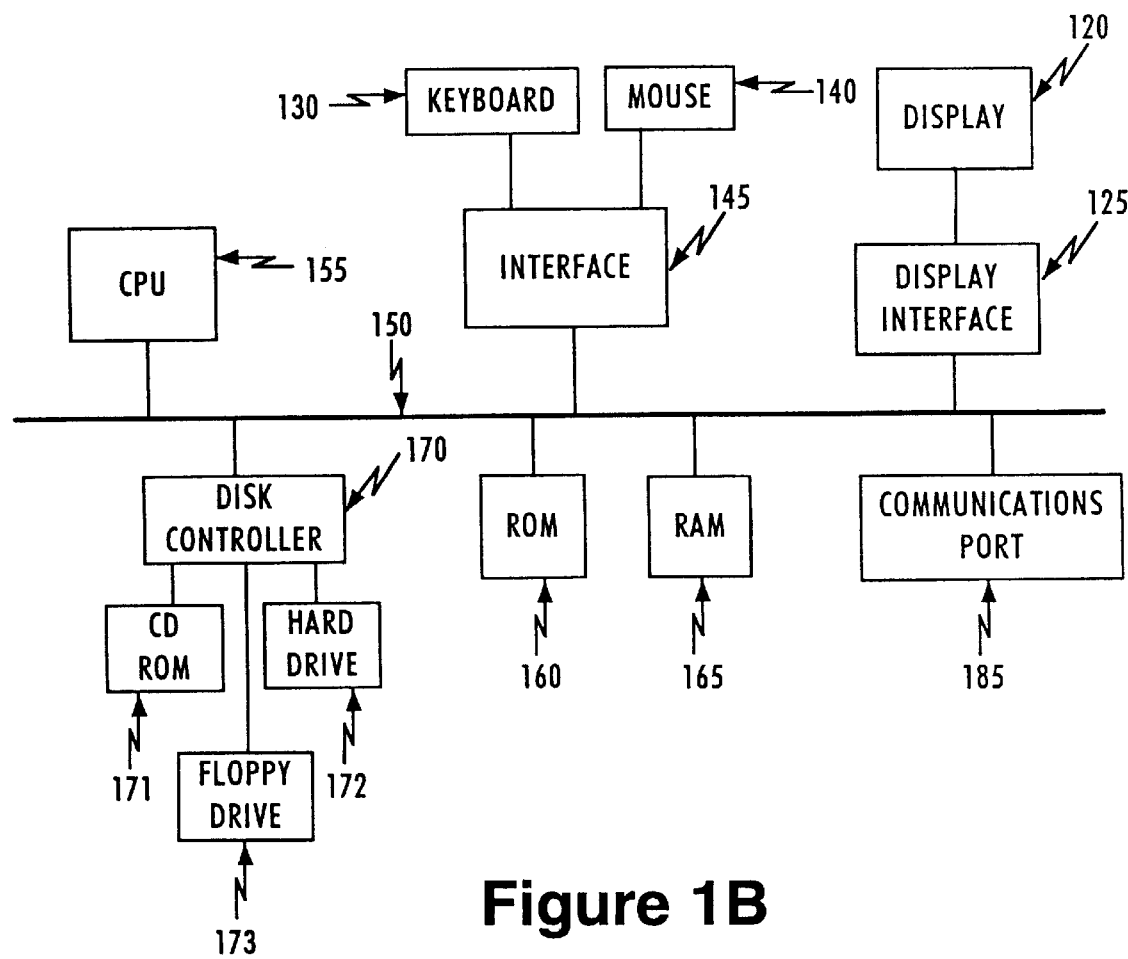
FIG. 1B illustrates a block diagram of the computer of FIG. 1A.

FIG. 1B illustrates a block diagram of the internal hardware of the computer of FIG. 1A. A bus 150 server is the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 175 interfaces a display 120 and permits information from the bus to be viewed on the display. Communications with external devices can occur over communications port 185.

Figure 1C:
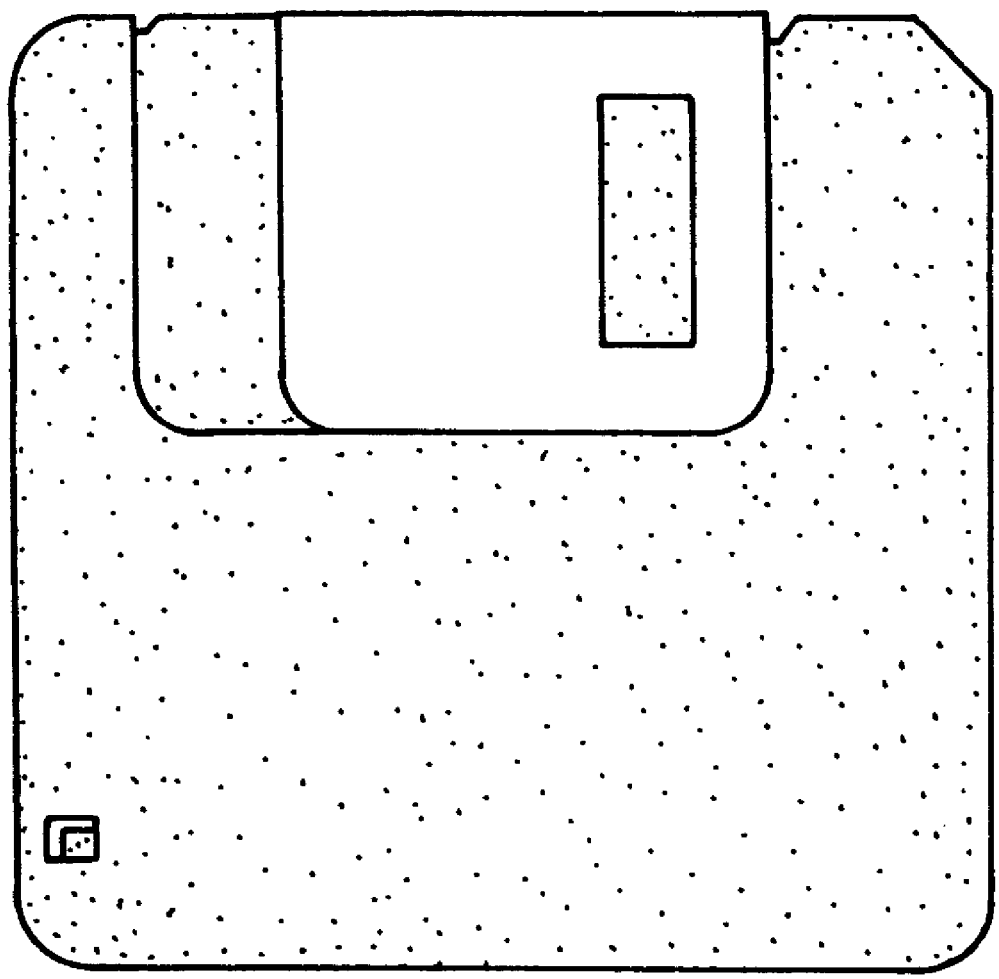
FIG. 1C illustrates an exemplary memory medium containing one or more programs and optionally data usable with the computer of FIG. 1A.

FIG. 1C illustrates an exemplary memory medium which can be used with drives such as 173 in FIG. 1B or 110A in FIG. 1A. Typically, memory media such as a floppy disk, CD ROM, or Digital Video Disk will contain the program information for controlling the computer to enable the computer to performs its functions in accordance with the invention.

Figure 2:
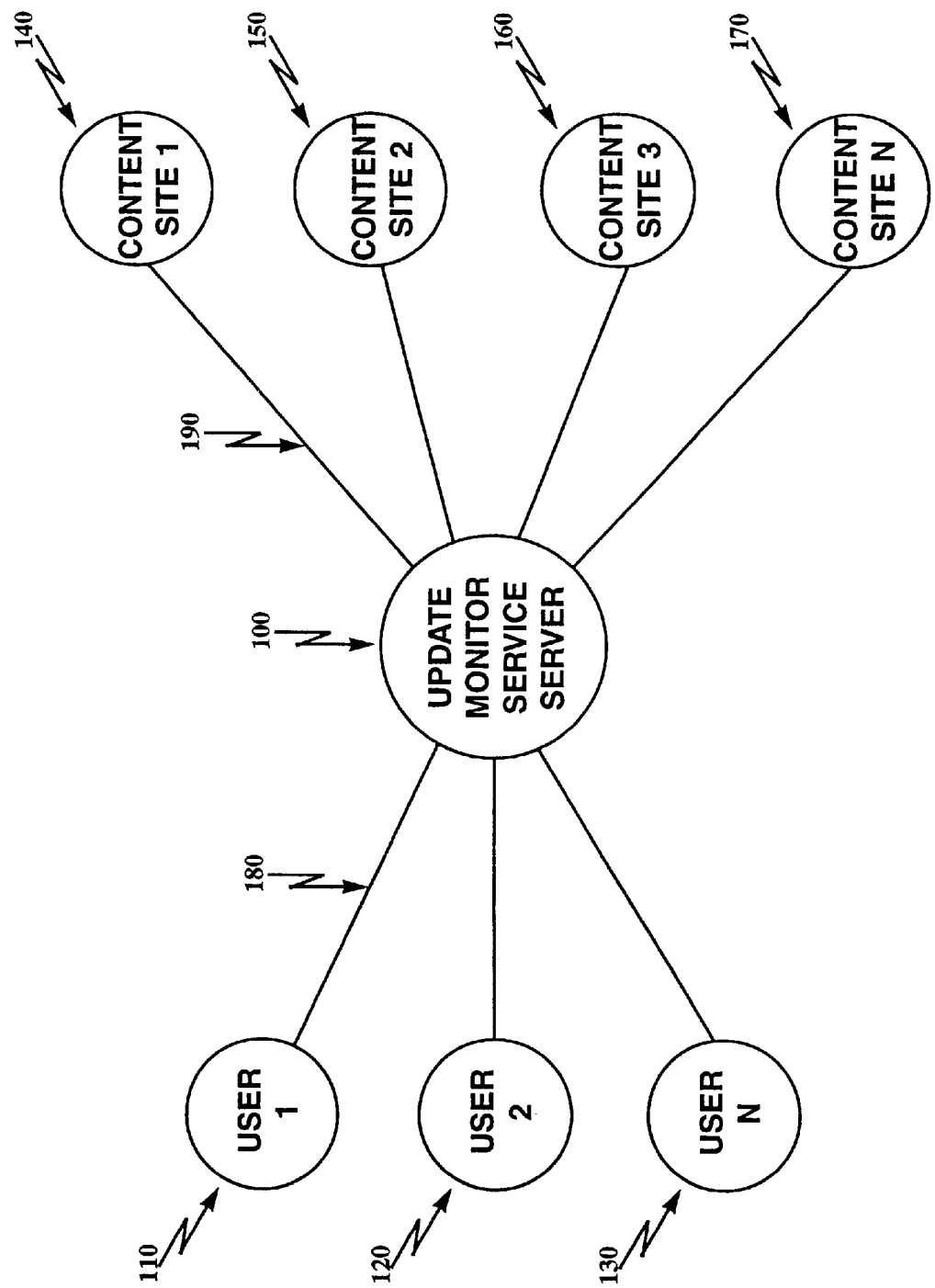
FIG. 2 is a block diagram of an update monitor service server and its relationship with users and content sites in accordance with the invention.

FIG. 2 is a block diagram of an update monitor service server and its relationship with users and content sites in accordance with the invention. The Update Monitor Service Server 100 resides logically between users (110–130) and content sites (140–170). The connection between the users and the server 180 is normally a network. Similarly, the connection between the server and the content sites 190 is normally a network. Note that 190 could also be a bus type connection if the server and the content sites are hosted on the same computing system (e.g., American Online™).

Figure 3:
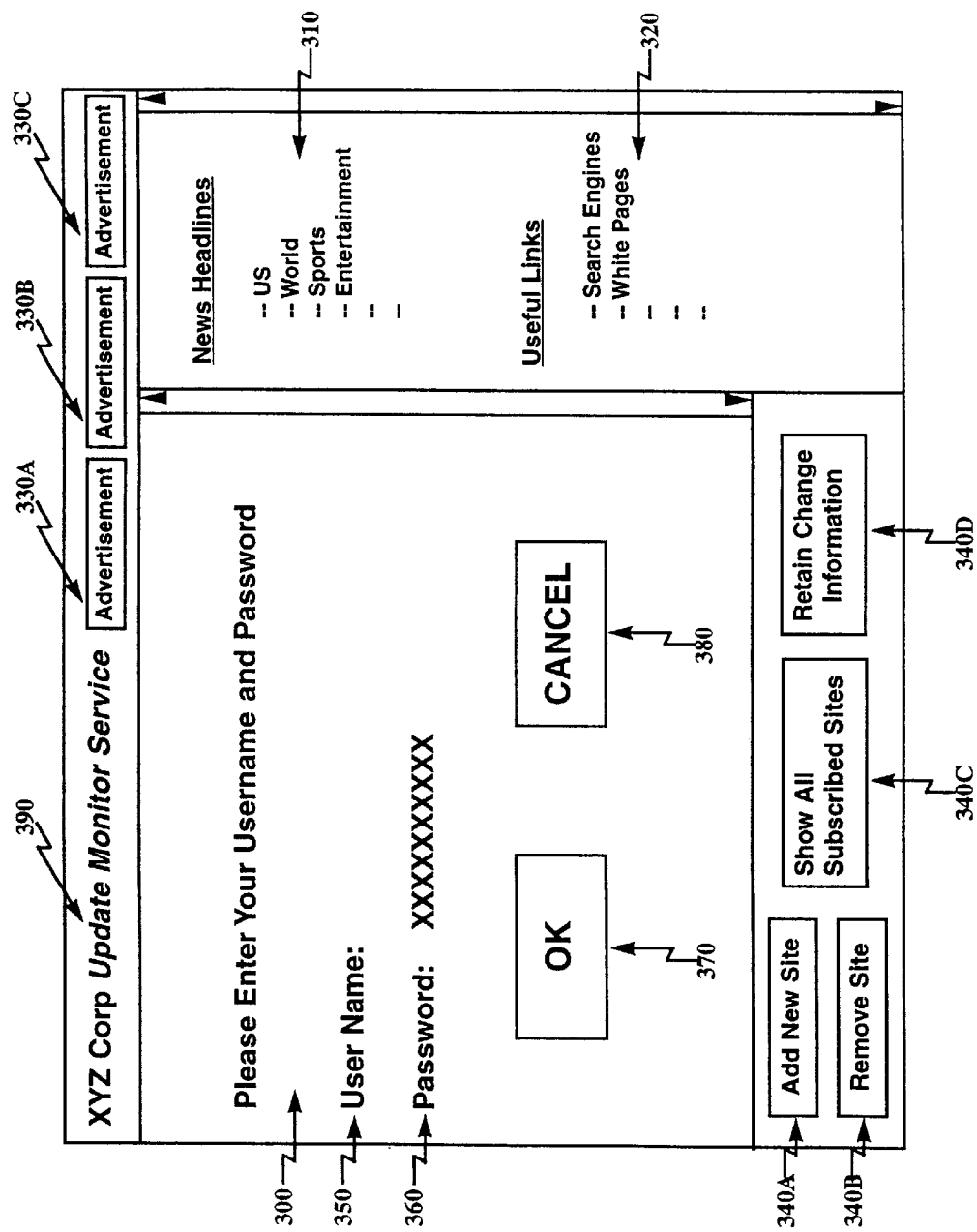
FIG. 3 illustrates an exemplary user interface by which a user accesses the update monitor service in accordance with the invention.

FIG. 3 illustrates an exemplary user interface by which a user accesses the update monitor service in accordance with the invention. The screen 300 portrayed here is that part of the screen that is independent of the browser being used. The user has accessed the monitor service 390 login page 300. If cookie login technology is employed this screen would not be seen and FIG. 4 would be the initial screen displayed. The user is prompted for his user name 350 and his password 360 and is provided with an OK button 370 and a CANCEL button 380. Additional user controls that will be made available after successful login are show at 340A, 340B, 340C and 340D. The update monitor service may choose to included advertising 330A 330B 330C to defray costs and may choose to provide newswire links 310 and other useful links 320 to encourage the user to visit the monitor page frequently.

Figure 4:
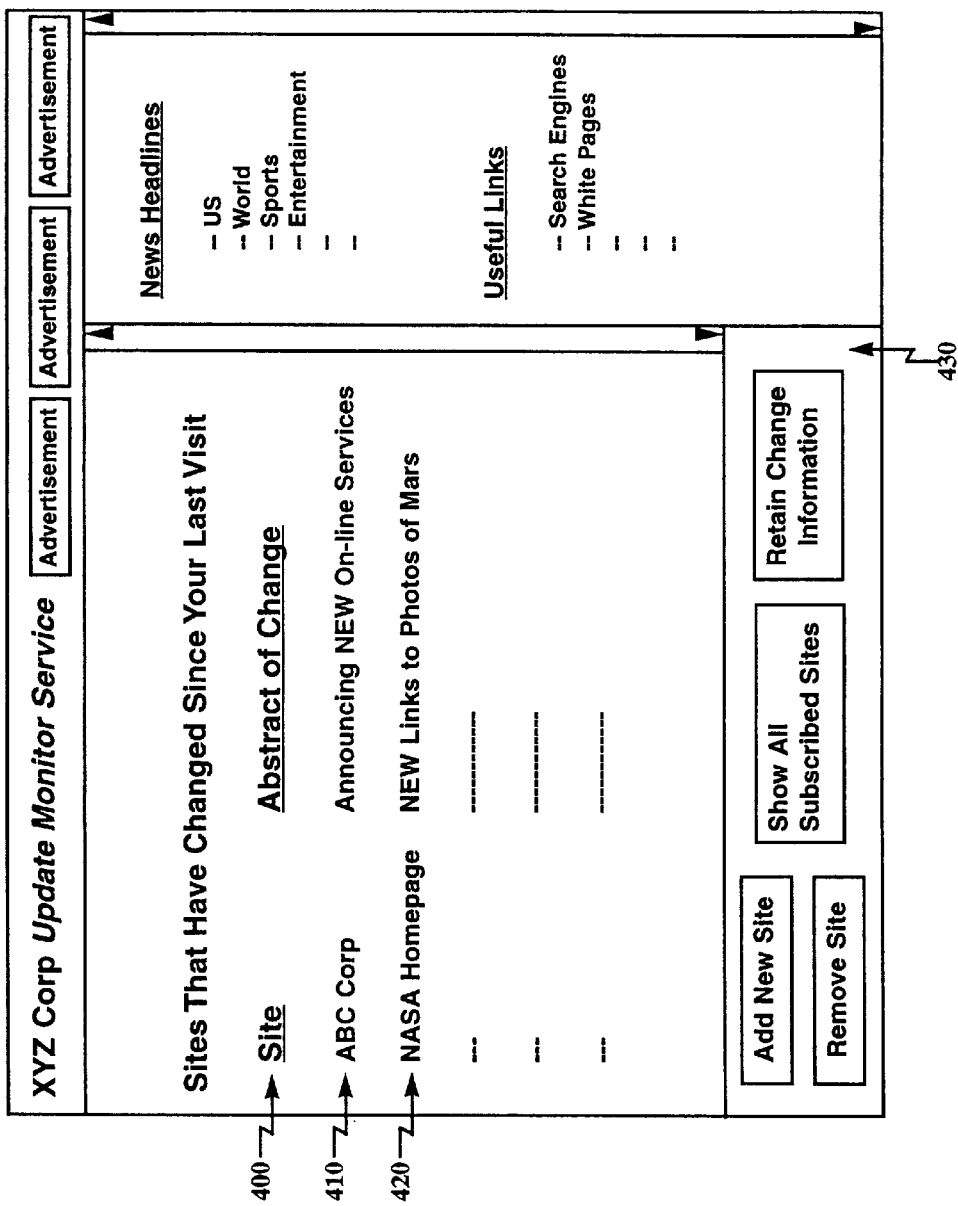
FIG. 4 illustrates an exemplary screen by which a user is notified of changed subscribed sites in accordance with the invention.

FIG. 4 illustrates an exemplary screen by which a user is notified of changed subscribed sites in accordance with the invention. Similar in layout to FIG. 3, this screen is displayed after successful explicit login or receipt of a cookie which contains the login information. The heading is changed to indicate the page is displaying monitored sites that have changed 400. Each site 410, 420 is listed by site name and includes an abstract of the changes to the site. The user control buttons are grouped at the bottom of the screen at 430.

Figure 5:
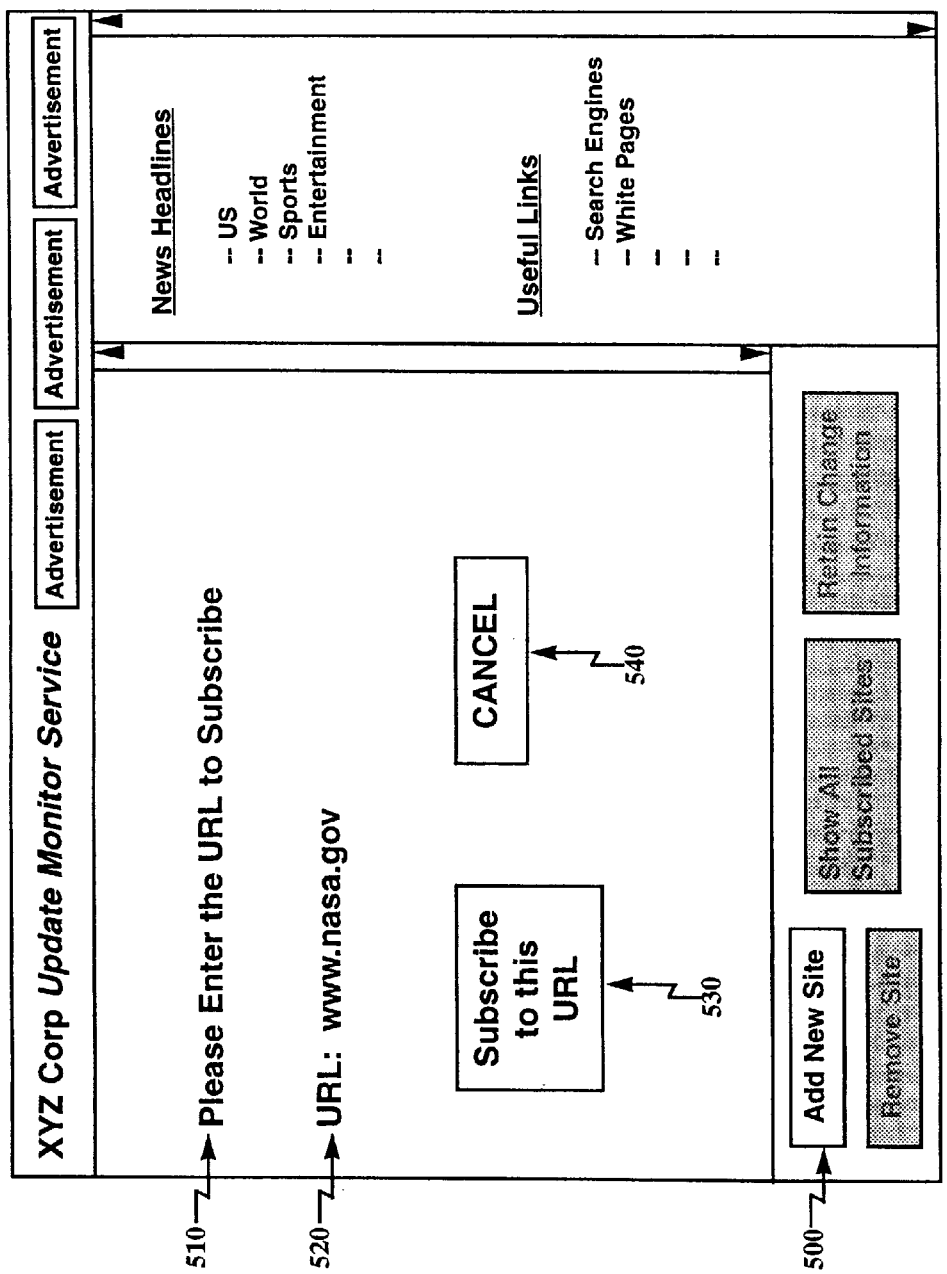
FIG. 5 illustrates an exemplary user interface by which a user can add a site to the subscribed list in accordance with the invention.

FIG. 5 illustrates an exemplary user interface by which a user can add a site to the subscribed list in accordance with the invention. By clicking on the "Add New Site" button 500 the user is prompted for the new site to monitor 510 and types it in or imports it using techniques known in the prior art at 520. The user then confirms his choice by clicking "Subscribe to this URL" 530 or else he may choose "Cancel" 540. During this process all the other user controls are dimmed and are unavailable for use, only the "Add New Site" button 500 is active.

Figure 6:
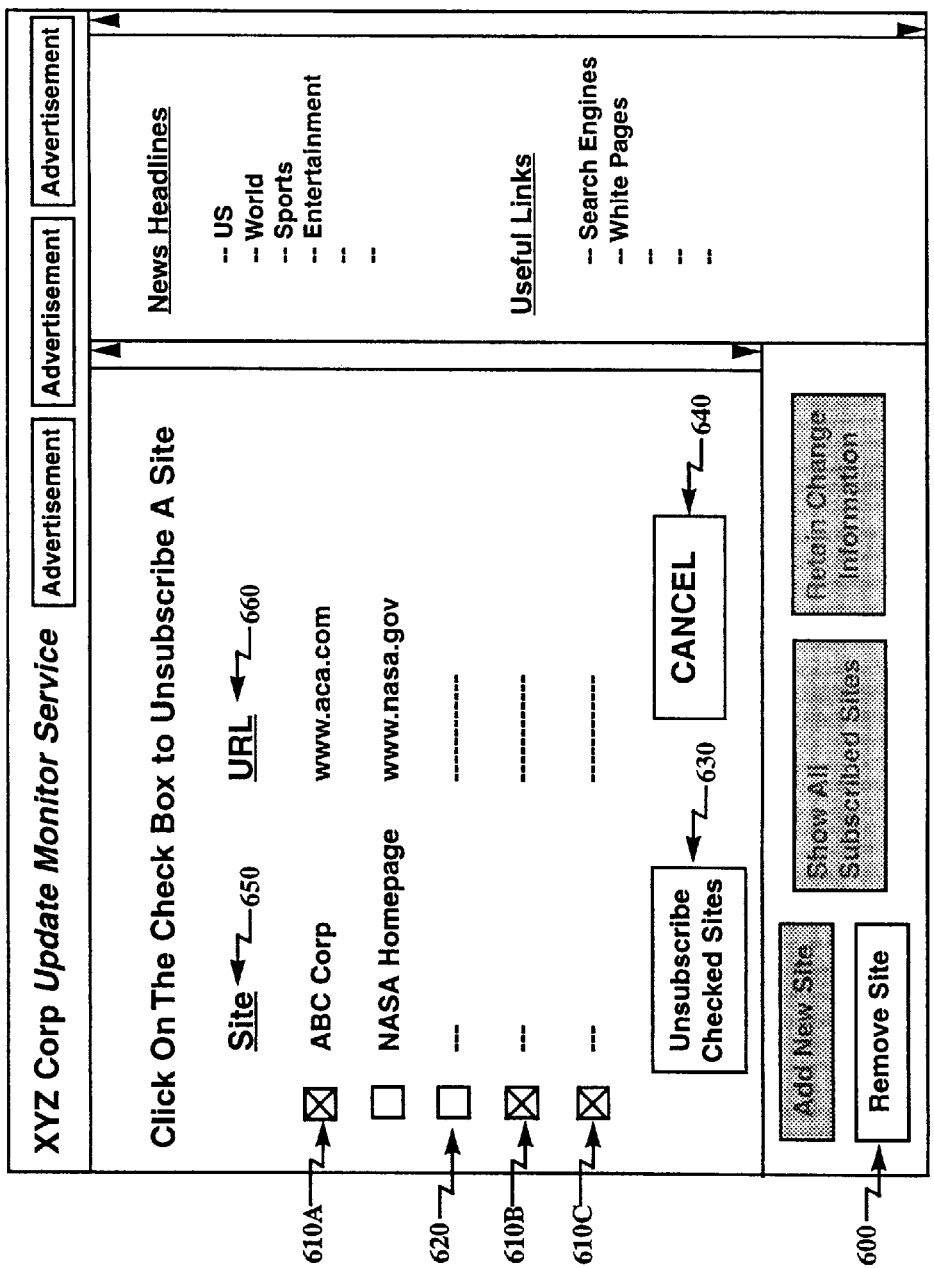
FIG. 6 illustrates an exemplary user interface by which a user can remove a site or sites from the subscribed list.

FIG. 6 illustrates an exemplary user interface by which a user can remove a site or sites from the subscribed list. This screen display's the site name 650 and the URL 660. By clicking on thee boxes 610A, 610B, 610C, and 610D the user can select or clear the sites to be removed. After marking sites for removal the user must choose either "Unsubscribe Checked Sites" 630 or "Cancel" 640. During this process all the other user controls are dimmed and are unavailable for use, only the "Remove Site" button 600 is active.

Figure 7:
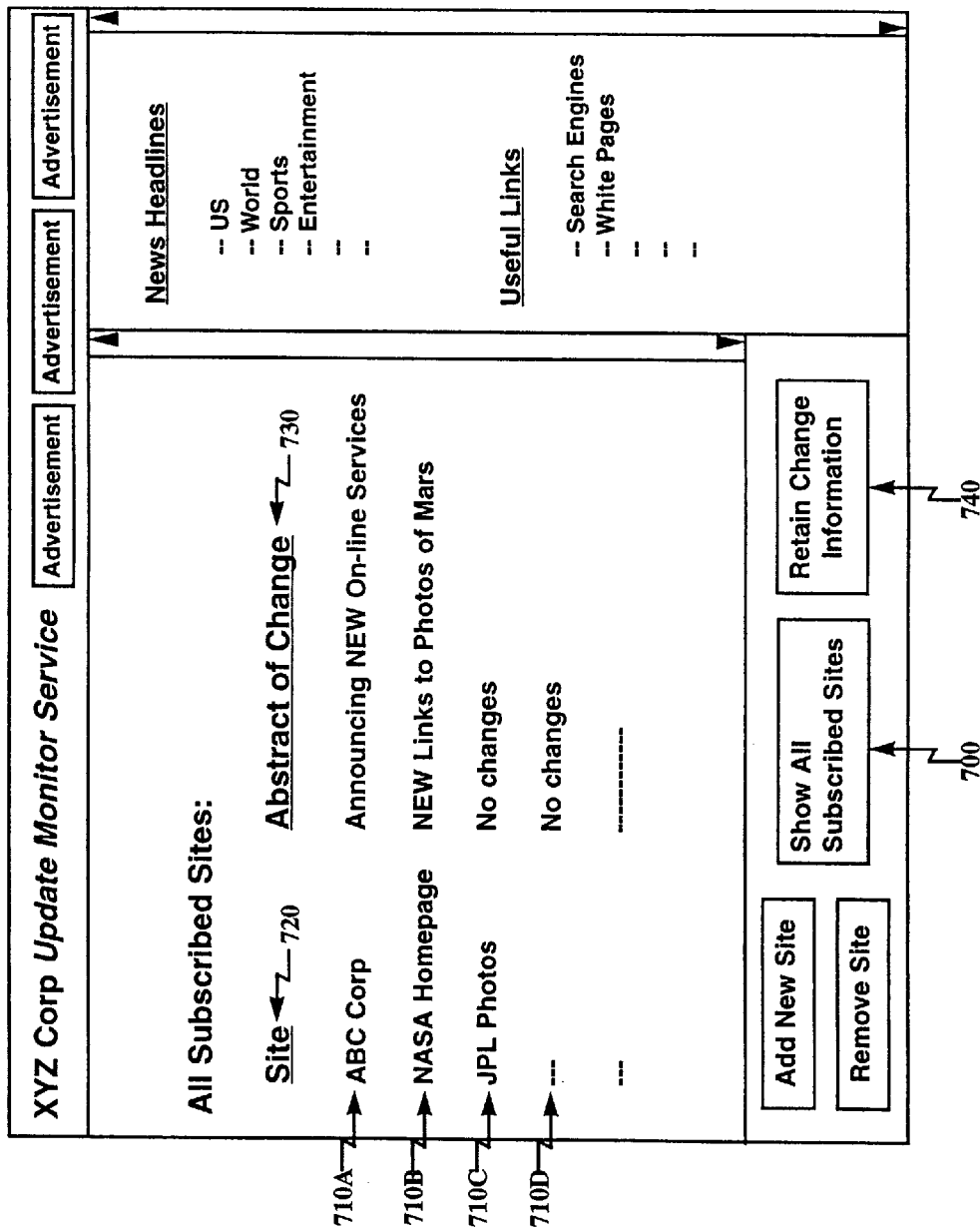
FIG. 7 illustrates an exemplary screen by which a user can view the entire subscribed list in accordance with the invention.

FIG. 7 illustrates an exemplary screen by which a user can view the entire subscribed list in accordance with the invention. By clicking on the "Show all Subscribed Sites" button 700 the user will activate this screen with heading at 720 and 730 which list the site name and, if it has been changed since the user's last visit, an abstract of the change or a degree of change indicator. Individual sites and abstracts are listed at 710A, 710B, 710C and 710D. The button "Retain Change Information" 740 is provided so that the user may leave the monitor site and return at a later time without losing change information that had been gathered prior to his current access.

FIG. 8 illustrates the Hypertext Markup Language (HTML) tagging system. HTLM uses a standard start-tag, end-tag method of delimiting text for later processing. To extract the site name a search is made for the <TITLE> . . . </TITLE> delimited text 800. If no text is found the process if repeated for the <H1> 810, <H2> 820, and <H3> 830 tags. The first text search that is successful is by definition the site name. If none of the text searches are successful, then the domain name 840 is used as the site name.

Figure 9:
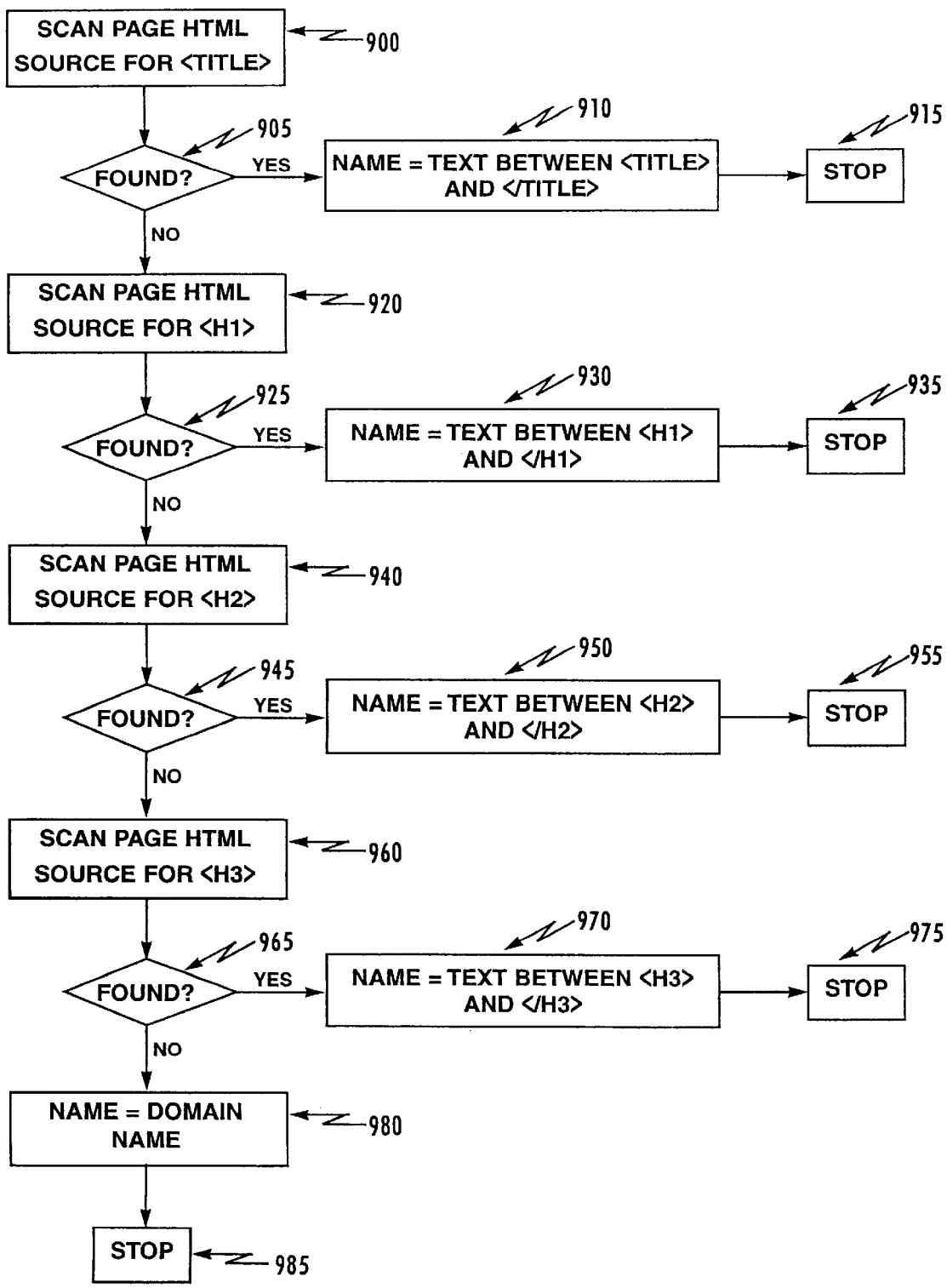
FIG. 9 is a flowchart for determining the name of a site using the tagging system shown in FIG. 8 in accordance with the invention.

FIG. 9 is a flowchart for determining the name of a site using the tagging system shown in FIG. 8 in accordance with the invention. The process begins by scanning the text of the site in search of the HTML tag <TITLE> 900. If the tag is found 905 the delimited text between the initial tag and the closing tag </TITLE> is used as the site name 910 and the process is terminated 915. If the tag was not found 905 then the search restarts 920 for the tag <H1>. If tie tag is found 925 the delimited text between the initial tag and the closing tag </H1> is used as the site name 930 and the process is terminated 935. If the tag was not found 925 then the search restarts 940 for the tag <H2>. If the tag is found 945 the delimited text between the initial tag and the closing tag </H2> is used as the site name 950 and the process is terminated 955. If the tag was not found 945 then the search restarts 960 for the tag <H3>. If the tag is found 965 the delimited text between the initial tag and the closing tag </H3> is used as the site name 970 and the process is terminated 975. If the tag was not found 965 then the site name is defined to be the domain name 980 and the process is terminated 985.

FIG. 10A is an exemplary database table layout for user information in accordance with the invention. The table is organized with five major fields. The first is the user identification string supplied by the user during account setup. The second is the user password supplied by the user during account setup. The third is the date and time stamp that is applied after successful login. The fourth is the date and time stamp of the previous login. The fifth indicates the security level requested by the user at login: a value of "HIGH" indicates that the user wants an explicit login and a value of "LOW" indicates that the user wants to use a cookie to provide login information.

FIG. 10B is an exemplary database table layout for relating user identifications to specific URLs for use by the invention in accordance with the invention. The table is organized into two major fields. The first is the user identification string supplied by the user during account setup and is identical in content to the field of the same name in FIG. 10A. The second field is the URL of the site the user wishes the invention to monitor for changes. Note that the same user identification can be entered into the table many times, once for each unique URL subscribed to.

Figures 10C, 10D:
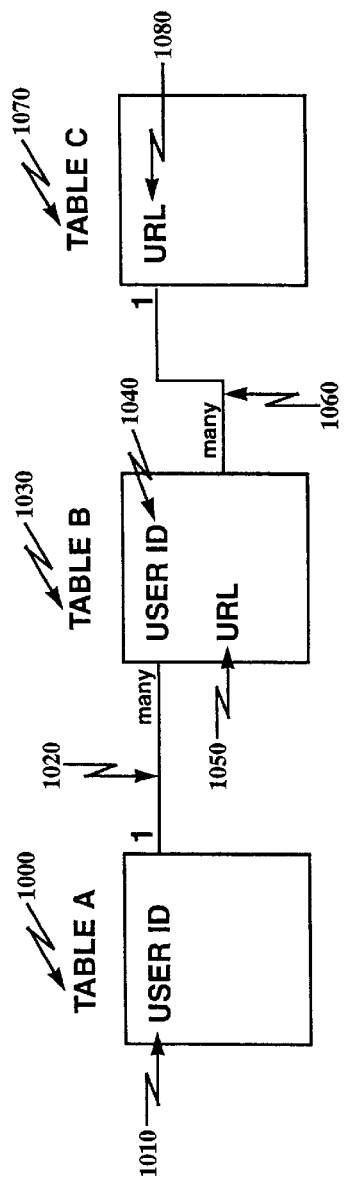
FIG. 10C is an exemplary database table layout for tracking of changes of specific URLs monitored by the invention in accordance with the invention.
FIG. 10D is an exemplary database layout for the update monitor service which combines the table layouts of FIGS. 10A, 10B and 10C in accordance with the invention.

FIG. 10C is an exemplary database table layout for tracking of changes of specific URLs monitored by the invention in accordance with the invention. The table is organized into 6 major fields. The first contains the URL which the service is monitoring. The second is the page name as determined by the process depicted in FIG. 9. The third is the email address of the update manager for each URL. The fourth is the date and time stamp of the last email message received from the update manager or the last time the degree of change process was invoked. The fifth is a numerical field that indicates the degree of change. The sixth is the abstract of changes received from the update manager of that URL. The seventh is the number of monitor service subscribers who have subscribed to this particular URL. Note that the degree of change field will be empty if the update manager email address is valid as the system is relying upon the update manager to send change abstracts as needed.

FIG. 10D is an exemplary database layout for the update monitor service which combines the table layouts of FIGS.

10A, 10B and 10C in accordance with the invention. Table A 1000 contains a user identification string 1010 which is used to map to Table B 1030 in a one-to-many relationship 1020. Table B 1030 contains each URL 1050 that a user 1040 has subscribed to. Table B 1030 use the URL 1050 to map to TABLE C 1070 which contains the same URL 1080 in a many-to-one relationship 1060. The result is the resolution of the many-to-many relationship that exists between Table A 1000 and Table B 1070.

Figure 11:
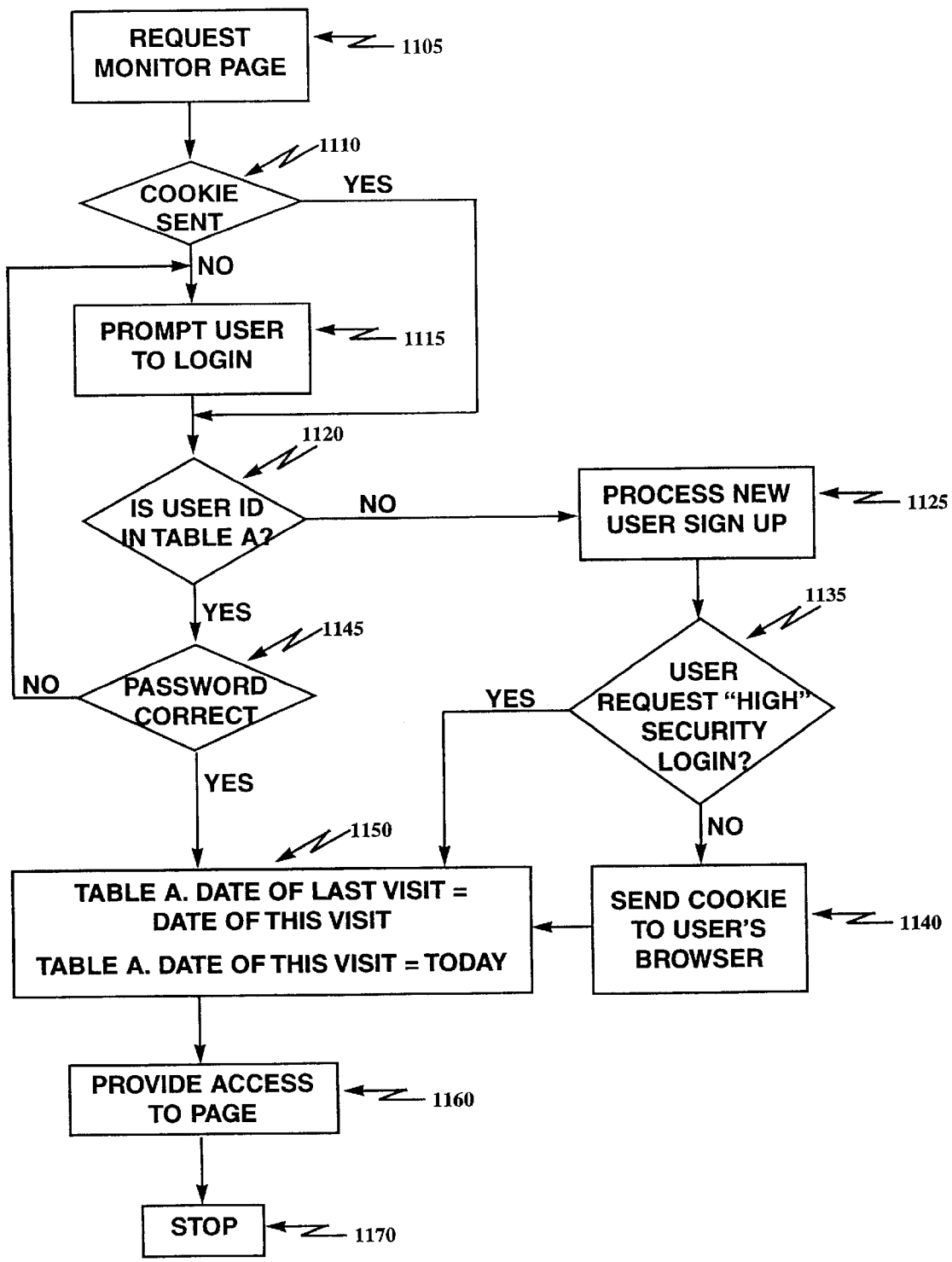
FIG. 11 is a flowchart for the login process utilized by the invention in accordance with the invention.

FIG. 11 is a flowchart for the login process utilized by the invention in accordance with the invention. The user requests access to the update monitor page by referencing its URL 1105. If a cookie was not sent along with the reference 1110 then the user is prompted for his user identification and password 1115. If a cookie was sent 1110 or the user explicitly logged on 1115 the user identification is looked up in Table A. If it is found 1120 then the password is verified for correctness and if it is valid 1145 the dates of last and current access are updated in Table A 1150, access to the monitor page is provided 1160 and the process is terminated 1170. If the user identification is not found in Table A 1120 then the process to sign up a new user is initiated 1125 and the user is asked to decide upon his security level. If the user does not require "HIGH" security 1135 a cookie is sent to his browser 1140 to eliminate the need for explicit logins. In either case, the dates of last and current access are updated in Table A 1150, access to the monitor page is provided 1160 and the process is terminated 1170. Note that if the password entered or received via a cookie is incorrect 1145 the explicit login process begins at 1115 as described above.

FIGS. 12A, 12B and 12C are message structures used by the invention to send messages to the update manager of monitored sites in accordance with the invention. FIG. 12A shows the content of an email message sent to a site update manager to subscribe to its update service. This message is only sent when a new URL is added to Table C. The URL in the Figure is replaced with the actual URL of the site to be monitored. In a similar fashion, FIG. 12B shows the content of an email message sent to a site update manager to unsubscribe from its update service. This message is only sent when the number of users subscribed to a site becomes zero in Table C. FIG. 12C is a message sent in reply to a message regarding updates of a URL not being monitored by the service.

FIG. 12D is the message structure expected by the update monitor service sent from the update manager to indicate changes in accordance with the invention. The update manager needs to indicate the URL being updated since one update manager may be in charge of many URLs. An abstract of the change is included which is stored in Table C along with the date and time of the email message. The abstract text will be truncated if it exceeds some pre-defined length allocated in Table C.

Figure 13A:
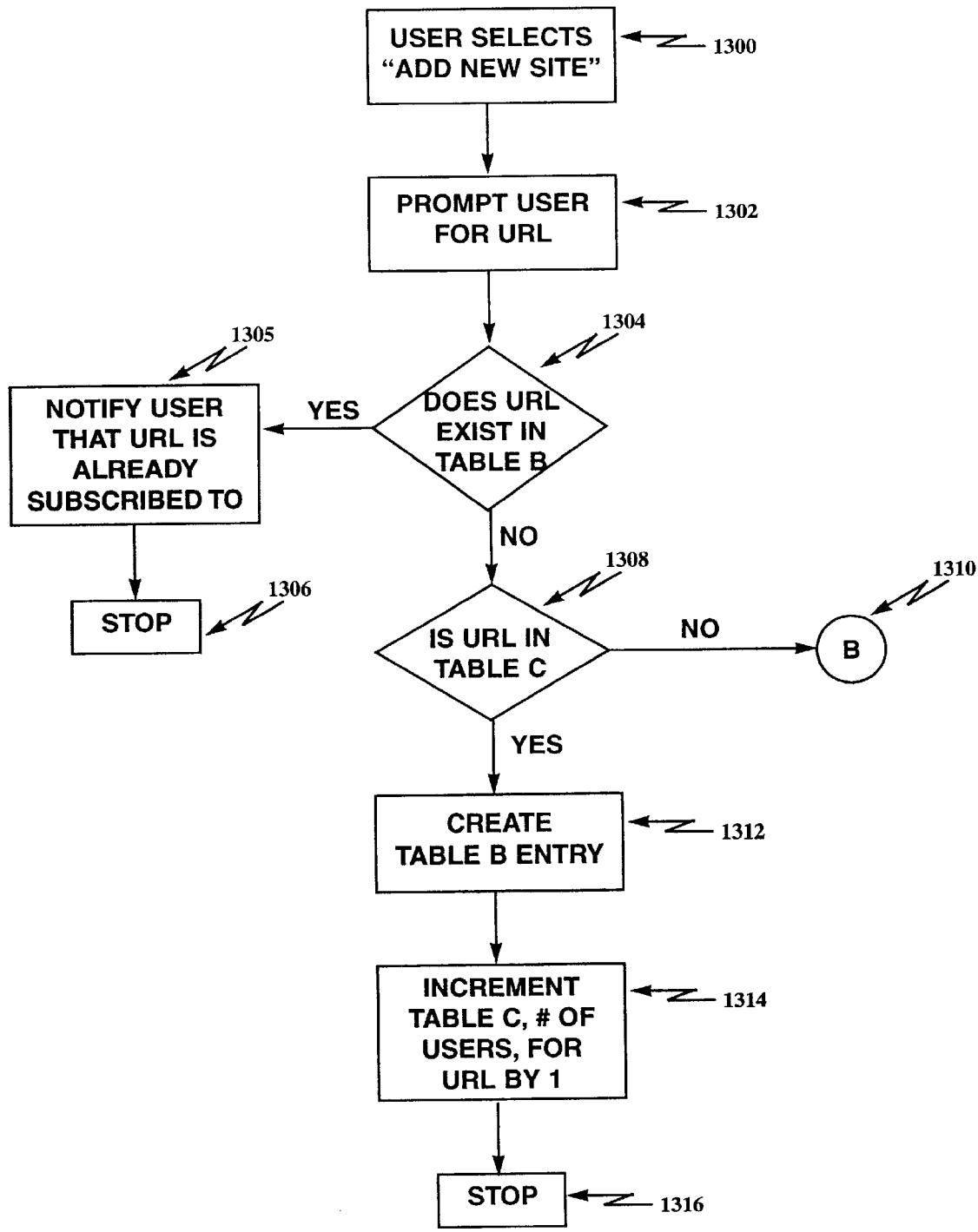
FIGS. 13A, 13B and 13C comprise a flowchart for adding a URL to the subscribed list database in accordance with the invention.
Figure 13B:
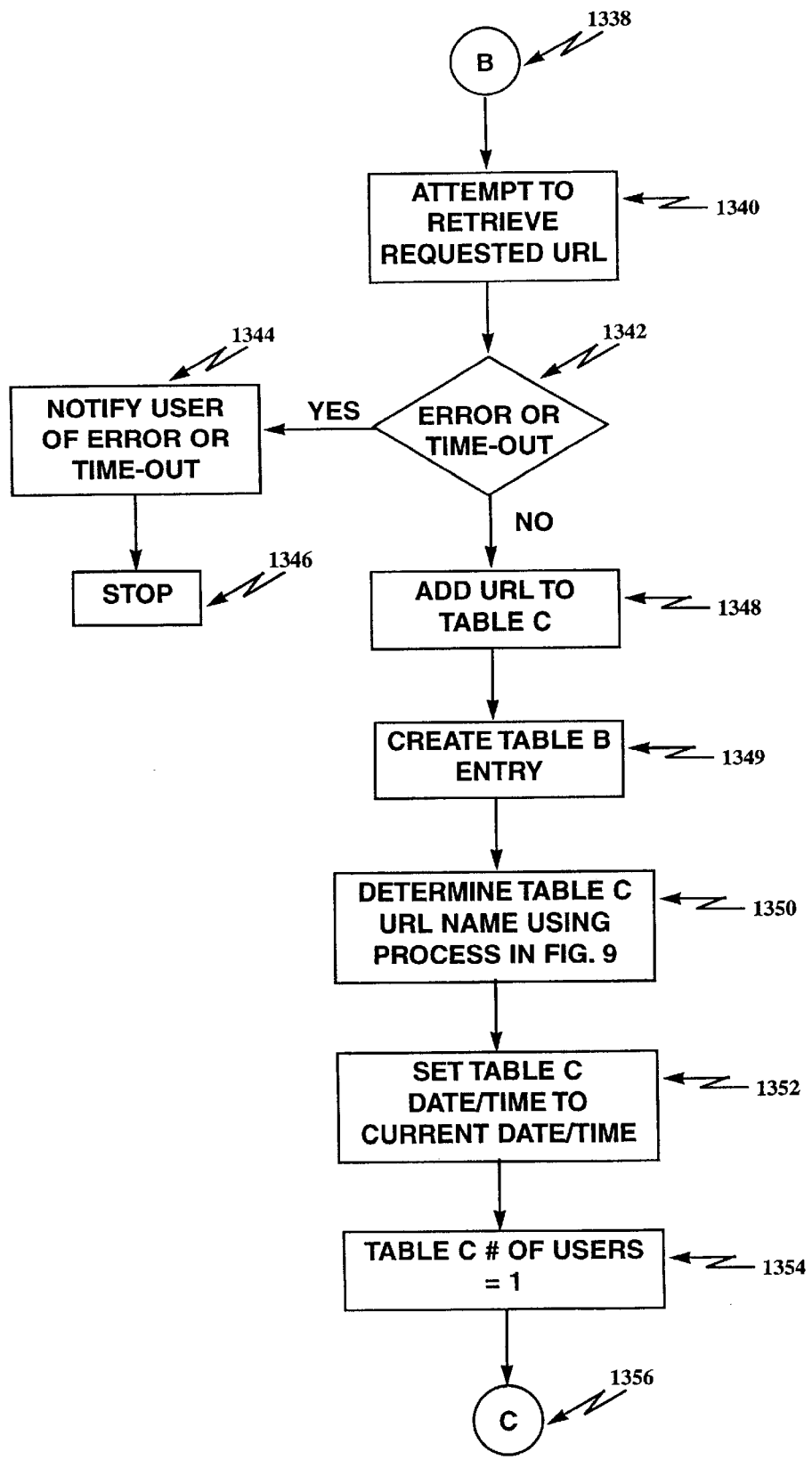
Figure 13C:
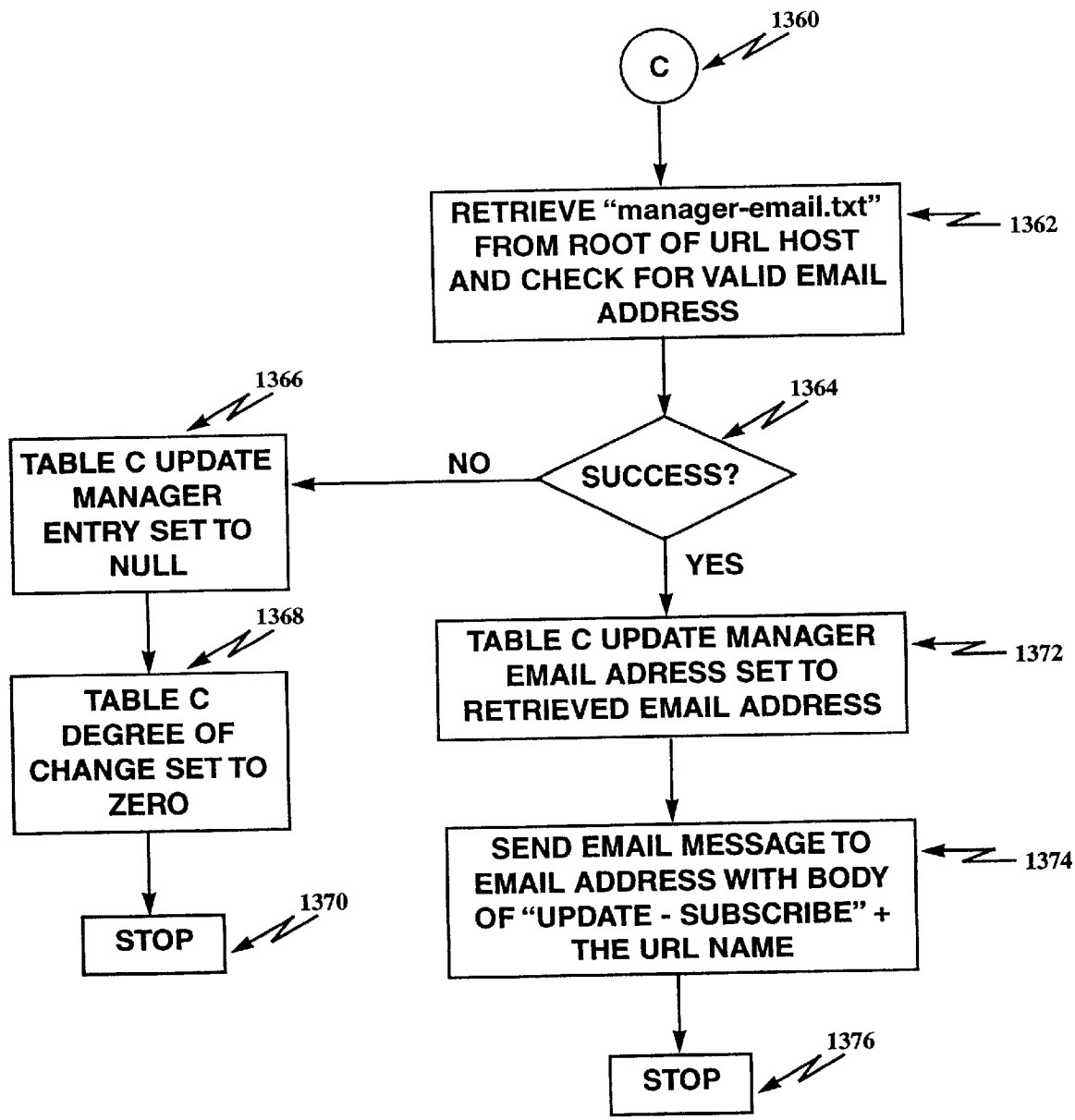

FIGS. 13A, 13B and 13C comprise a flowchart for adding a URL to the subscribed list database in accordance with the invention. The user selects the "Add New Site" option 1300 and is prompted for the URL 1302. If the URL exists in Table B 1304 then the user is notified that he already subscribes to that URL 1305 and the process is terminated 1306. If the URL does not exist in Table B 1304 but it does exist in Table C 1308 then the service is already monitoring the URL for at least one other user. Thus a new entry for this particular user and URL is added to Table B 1312 and the number of users tracking this URL in Table C is incremented by one 1314 and the process is terminated 1316.

Alternatively, if the URL is not found in Table C 1308 then control is transferred from exit point B 1310 to entry point B 1338 in FIG. 13B. The monitor service attempts to retrieve the URL 1340. If the attempt results in an HTTP error or a time-cut occurs 1342 the user is notified of the error or time-out condition 1344 and the process is terminated 1346. If no error occurs 1342 the URL is added to Table C 1348 and a Table B entry is added 1349. The site name is determined using the process described in FIG. 9 and added to Table C 1350, the date and time in Table C is set to the current date and time 1352 and the number of users in Table C is set to one 1354. Control is then passed from exit point C 1356 to entry point C 1360 in FIG. 13C.

The monitor service then attempts to retrieve a file named "manager_email.txt" from the root directory of the URL's host and the file is scanned for a valid email address 1362. If the file is not found or an invalid email address is contained within it 1364 the Table C update manager entry is set to null 1366, the Table C degree of change metric is set to zero 1368 and the process is terminated. If the file was found and contained a valid email address 1364 then the Table C update manager email address attribute is set to the retrieved email address 1372, an email message is generated and sent to the received email address with a message body of "UPDATE-SUBSCRIBE" concatenated with the actual URL 1374 and the process is terminated 1376.

Figure 14:
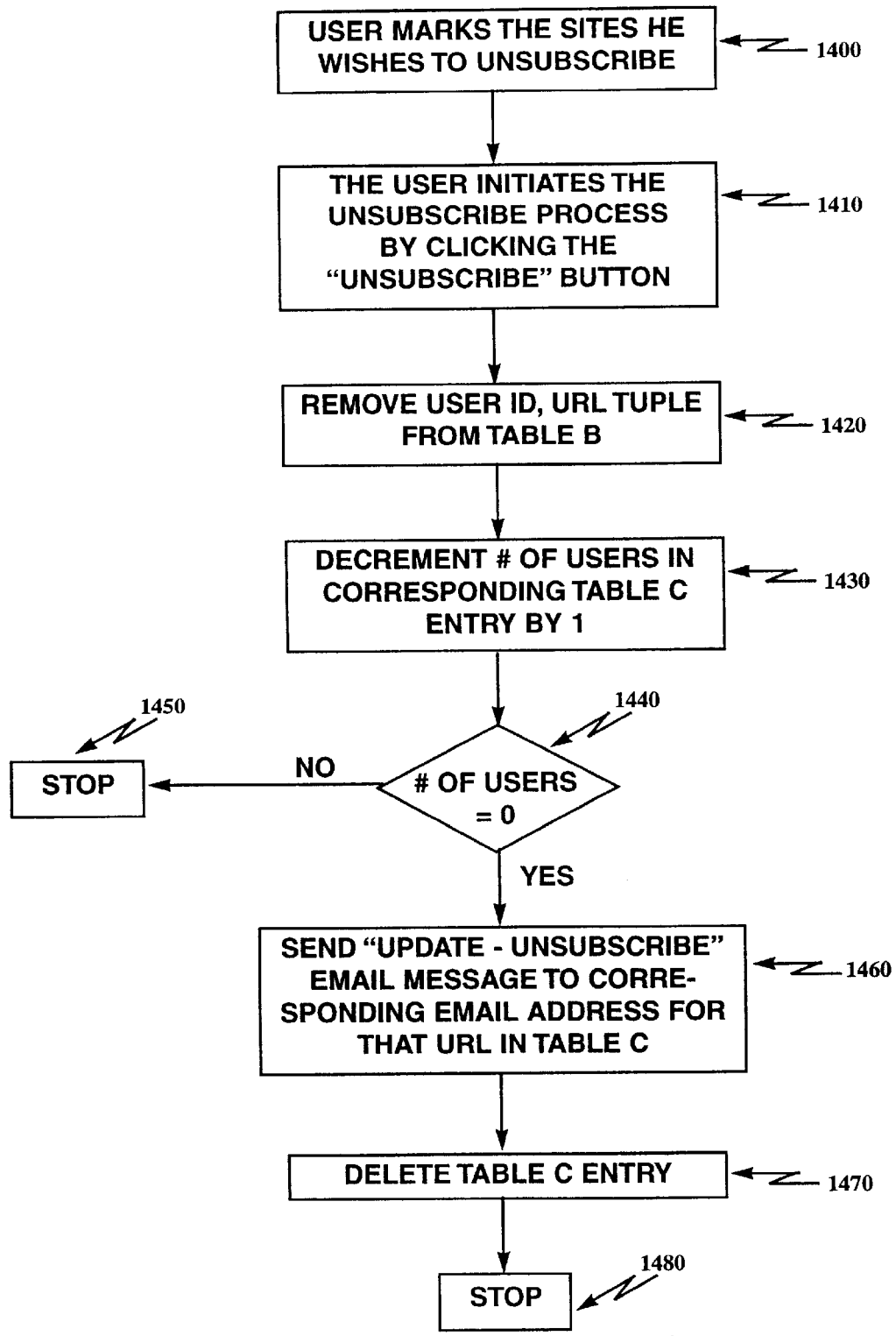
FIG. 14 is a flowchart for deleting a subscribed URL from the subscribed list database in accordance with the invention.

FIG. 14 is a flowchart for deleting a subscribed URL from the subscribed list database in accordance with the invention. The user initiates this process by marking those sites he wishes to unsubscribe from 1400 and then pressing the "Unsubscribe" button 1410. For each URL marked for deletion the user's user identification and URL tuple are removed from Table B 1420 and the number of users attribute in the corresponding Table C entry is decremented by one 1430. If the number of users is still greater than zero 1440 then the process is terminated 1450. If the number of users is equal to zero 1440 then the monitor service sends an email message with a message body of "UPDATE-UNSUBSCRIBE" concatenated with the URL to the email address of the update manager corresponding to the URL that is stored in Table C 1460. The Table C entry for the URL is then removed 1470 and the process is terminated 1480.

Figure 15:
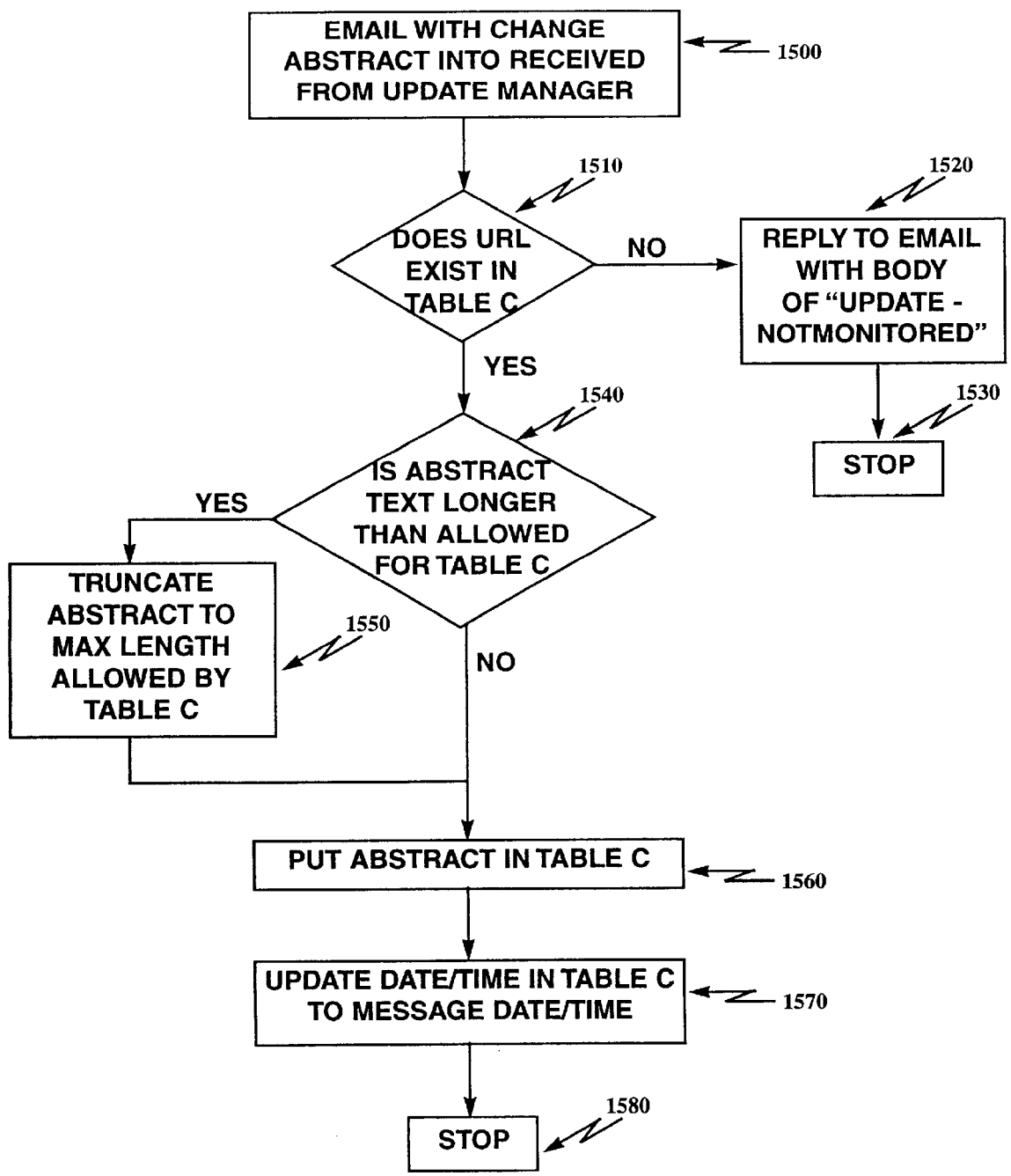
FIG. 15 is a flowchart for adding change information to the subscribed list database in accordance with the invention.

FIG. 15 is a flowchart for adding change information to the subscribed list database in accordance with the invention. The process begins when an email is received from an update manager 1500. If the URL referenced in the abstract change message does not exist in Table C 1510 then a reply is generated with a message body of "UPDATE-NOTMONITORED" 1520 and the process is terminated 1530. If the URL referenced in the message does exist in Table C 1510 then the length of the abstract text is determined. If the length is greater than the maximum length that Table C will accept 1540 then the abstract in truncated to the maximum allowable length 1550. If truncation is not needed 1540 or the truncation has been performed 1550 then the abstract is placed in Table C 1560, the date and time fields in Table C are updated to the date and time the message was sent by the update manager 1570 and the process is terminated 1580.

Figure 16:
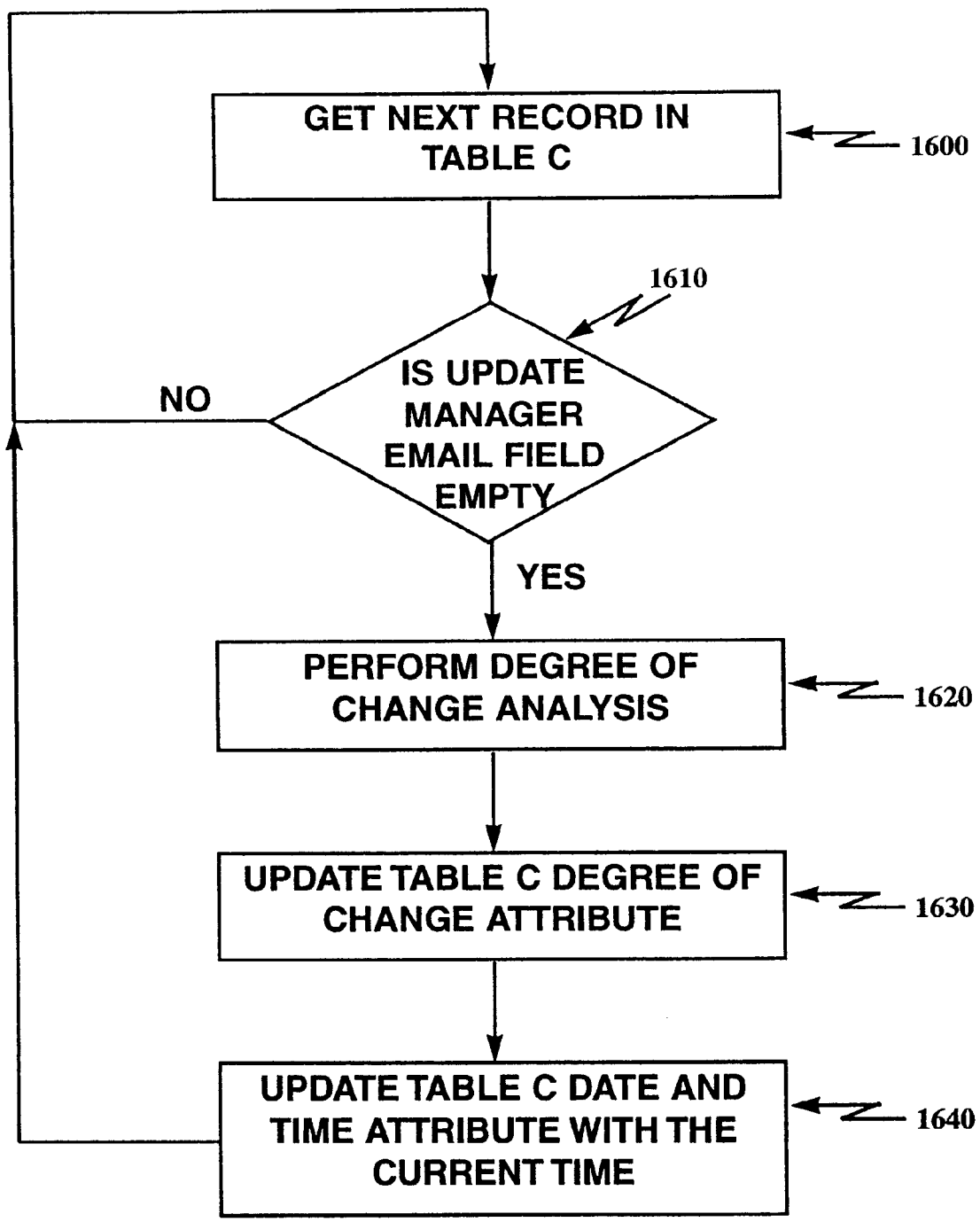
FIG. 16 is a flowchart for utilizing the Degree Of Change algorithm for those subscribed list database entries that do not receive change information in accordance with the invention.

FIG. 16 is a flowchart for utilizing the Degree Of Change algorithm for those subscribed list database entries that do not receive change information in accordance with the invention. This process is performed in a batch mode during periods of low load on the update monitor service server. The process begins by retrieving each record sequentially from Table C 1600. If the update manager email field is empty 1610 then the degree of change analysis described in more detail in the aforesaid co-pending application is performed 1620, the resulting value stored in Table C 1630 and the date and time values in Table C are updated to reflect the current time 1640.

There has thus been described an update monitor service which overcomes the problems of the prior art and greatly facilitates a users monitoring of multiple network sites for changed information.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. Apparatus for monitoring changes in content on a network, comprising:
   a. a computer connected to said network;
   b. a database of network addresses of information stored on said network to be monitored for changes, said addresses including at least one address of information not stored on said computer; and
   c. a process running on said computer for determining when information at a network address has changed.

2. Apparatus of claim 1 in which said database further includes a table relating subscribers to the network addresses that are to be monitored for a subscriber.

3. Apparatus of claim 1 in which said database further includes a table of subscriber information.

4. Apparatus of claim 1 in which said database includes information summarizing any change that has occurred in said information at a network address.

5. Apparatus of claim 1 in which said process receives a message from a network site servicing a specific network address summarizing a change that has occurred in information at that address.

6. Apparatus of claim 5 in which said process stores information from said message in said database.

7. Apparatus of claim 1 in which said process manages information about subscribers who are authorized to receive information about changes to information at a network address.

8. A system comprising:
   a. a network;
   b. one or more content servers connected to said network;
   c. one or more user computers connected to said network;
   d. an update monitor service server connected to said network, said update monitor service server being configured to provide information to one or more user computers about changes in content of information stored on one or more content servers.

9. The system of claim 8 in which at least one of said one or more content servers provides information to said update monitor service that a change had been made to information on said content server.

10. The system of claim 9 in which the information that a change had been made includes a textual summary of the change.

11. The system of claim 8 in which said update monitor service server permits access to user computers on a subscription basis.

12. The system of claim 8 in which said update monitor service server is configured to maintain a list of one or more users of user computers and respective network addresses of information stored on said network to be monitored for changes.

13. The system of claim 8 in which said update monitor service server is run as a process on an internet service provider computer.

14. The system of claim 8 in which said update monitor service server is run on a dedicated network server.

15. A method of providing information to one or more users about changes in content of information stored on one or more network servers, comprising the steps of:
   a. providing an element for performing the step of registering a user together with a list of network addresses of information the user desires to monitor for change in a database; and
   b. providing an element for performing the steps of, for each unique network address, subscribing to a change notification service provided by a server on which a network address is located, if one is provided.

16. The method of claim 15 further comprising the step of providing an element for performing the step of calculating a degree of change based on current and previous versions of information content stored on one or more network servers, if a change notification service is not provided by said server on which a network address is located.

17. The method of claim 15 further comprising the step of providing an element for performing the step of permitting users to create, modify and delete said list of network addresses of information the user desires to monitor for change.

18. A computer program product, comprising:
   a. a memory medium;
   b. a computer program, stored on said memory medium, said computer program comprising instructions for registering a user together with a list of network addresses of information the user desires to monitor for change in a database on a computer, said addresses including at least one address of information not stored on said computer.

19. The computer program product of claim 18 in which said computer program further comprises instructions for subscribing to a change notification service provided by a server on which a network address is located, if one is provided, for each unique network address.

20. The computer program product of claim 18 in which said computer program further comprises instructions for permitting users to create, modify and delete said list of network addresses of information the user desires to monitor for change.

* * * * *